Patented June 7, 1949

2,472,458

UNITED STATES PATENT OFFICE 2,472,458

IMIDAZOLIDO THIOPHANES AND METHODS OF PREPARING SAME

Bernard R. Baker, Nanuet, and Merle V. Querry, Pearl River, N. Y., assignors, by mesne assignments, to American Cyanamid Company, New York, N. Y., a corporation of Maine No Drawing. Application August 14, 1945, Serial No. 610,872

11 Claims. (Cl. 260—309)

1

The present invention relates to new organic compounds. More particularly it relates to substituted imidazolido thiophanes and methods of preparing the same.

The new compounds of the present invention can be illustrated by the following general formula:

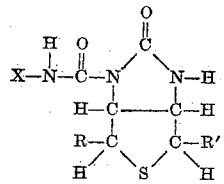

in which X is a hydrogen, aromatic or an aliphatic radical and R and R' are hydrogen or N-substituted carbamidoalkyl radicals.

We can prepare the new compounds of the present invention by mixing a substituted ureylenethiophane carboxhydrazide with nitrous acid in a solvent.

The compounds of the present invention are white solids. They are soluble in methanol, ethanol, butanol, and other hydroxylated solvents, acetone, acetic acid, dioxane, pyridine, etc. They have relatively high melting points.

The ureylenethiophane carboxhydrazides used as intermediates in the present invention are described and claimed in our copending application Serial No. 610,682, filed August 13, 1945, now U. S. Patent No. 2,451,429.

Among the intermediates we can use, the following may be mentioned specifically: 2-(delta-carbanilidobutyl) - 4 - uranilinothiophane - 3-cis-carboxhydrazide, 2-(delta - methylcarbamidobutyl) -4-uranilinothiophane - 3 - cis-carboxhydrazide, 2-(delta-ethylcarbamidobutyl) -4-uranilinothiophane-3-cis-carboxhydrazide, 2-(delta - carbanilidobutyl) -4-methyluramidothiophane-3-cis-carboxhydrazide, 2-(delta - methylcarbamidobutyl) -4-methyluramidothiophane-3-cis-carboxhydrazide, 2-(delta-ethylcarbamidobutyl) -4-methyluramidothiophane - 3 - cis-carboxhydrazide, 3-uranilinothiophane - 4 - cis - carboxhydrazide, 3-methyluramidothiophane-4-cis - carboxhydrazide, 2 - (delta - carbanilidobutyl) - 3 - uranilinothiophane-4-cis-carboxhydrazide, 2-(delta-carbanilidobutyl) - 3 - methyluramidothiophane-4-cis-carboxhydrazide and the like.

2

We have found, unexpectedly, that when compounds such as those listed above are heated with nitrous acid in the presence of a solvent, not only does the carboxhydrazide radical rearrange to an amine derivative, but an imidazolido thiophane ring is formed as well. Those compounds which have in the 2-position a carboxybutyl or substituted carboxybutyl radical are particularly valuable in the synthesis of biotin. They can be heated with barium hydroxide to form 2-(delta-carboxybutyl)-3,4-cis diaminothiophane, which when treated with phosgene gives dl biotin, as shown in Example 1.

In carrying out the reaction we can use nitrous acid itself although we prefer to prepare the nitrous acid in the reaction mixture during the course of the reaction by adding to the mixture alkyl nitrites, such as methyl nitrite, ethyl nitrite, amyl nitrite, isoamyl nitrite, etc., salts of nitrous acid, such as, sodium nitrite, potassium nitrite, ammonium nitrite, etc., and an acid.

In preparing the compounds of our invention we prefer to carry out the reaction under anhydrous conditions as the yields are higher and the reaction proceeds more smoothly. The reaction is carried out by mixing the desired intermediate with an anhydrous solvent such as anhydrous methanol, ethanol, propanol, butanol, etc. and a small amount of an acid. We can use acids such as hydrochloric, sulfuric, nitric, acetic, phosphoric, etc., but we prefer to use a solution of hydrogen chloride in an anhydrous solvent as this aids in maintaining anhydrous conditions in the reaction mixture. A nitrite is added, preferably an alkyl nitrite. The reaction can be carried out at temperatures ranging from 0° C. to 125° C. and is usually completed in from about one-half hour to about twenty-four hours. We prefer, however, to carry out the reaction at a temperature of from about 60° C. to about 100° C. at which temperature the reaction is generally complete in from about one-half hour to about three hours.

The product can be recovered from the reaction mixture by evaporating the solvent and crystallizing the residue from methanol, benzene-petroleum ether mixtures, etc.

Our invention will now be illustrated in greater detail by means of the following specific examples in which representative ureylenethiophane carboxhydrazides are converted to the corresponding imidazolido thiophanes. It will be understood, of course, that these examples are given for purposes of illustration and are not to be considered as limiting our invention to the particular details described therein.

*Example 1*

To a hot suspension of 3.7 g. of 2-(delta-carbanilidobutyl) - 4 - uranilinothiophane - 3 - cis-carboxhydrazide (obtained by heating 3-phenyl-6 - (delta - carbanilidobutyl) - 5,6,8,9 - tetrahydro [3,4,c,cis] uracil with hydrazine hydrate) in 125 cc. of dry butanol was added a solution of 0.42 g. of hydrogen chloride in 5 cc. of butanol. To the clear solution was added 1.04 cc. of butyl nitrite with swirling. The solution was then heated on the steam bath for one hour, gas evolution being complete in five minutes. The solvent was removed in vacuo, the residue cooled and triturated with methanol. A yield of 1.83 g. (51%) of 2-(delta-carbanilidobutyl)-5-keto-6-carbanilidoimidazolido [4,5,c,cis] thiophane was obtained which on recrystallization from methanol gave white crystals melting at 214°–216° C.

A mixture of 2.0 g. of 2-(delta-carbanilidobutyl)-5-keto-6-carbanilidoimidazolido [4,5,c,cis] thiophane, 10 cc. of 50% methanol and 8 g. of barium hydroxide octahydrate was heated and shaken in a bomb at 160° C. for forty hours. The bomb contents were rinsed out with water and the excess baryta removed with Dry Ice. The filtrate, washed three times with chloroform to remove aniline, was made just blue to Congo red by the addition of 1 N sulfuric acid (15 cc.). After removal of the barium sulfate the solution was evaporated to dryness in vacuo and triturated with methanol. The almost colorless crystals were collected on a filter and washed with methanol. A yield of .76 g. (53%) of 2 - (delta - carboxybutyl) - 3,4 - cis - diaminothiophane sulfate was obtained which melted at 257°–258° C. with decomposition.

A clarified solution of 650 mg. of 2-(delta-carboxybutyl) - 3,4-cis-diaminothiophane sulfate in 26 cc. of 10% potassium carbonate was treated with phosgene with shaking and ice cooling until acidic. The white crystals which separated were collected on a filter and washed with ice water. A yield of 450 mg. (90%) of 2-(delta-carboxybutyl)-5-ketoimidazolido [4,5,c,cis] thiophane (dl-biotin) was obtained. When recrystallized from 50% aqueous methanol the product was in the form of long white needles which had a melting point of 230°–232° C. An assay with *Lactobacillus arabinosis* showed that this product had 52% of the activity of natural d-biotin.

*Example 2*

To a stirred solution of 1.9 g. of cis-4-uranilinothiophane-3-carboxhydrazide in 70 cc. of 1 N hydrochloric acid and 50 cc. of chloroform was added, with ice cooling, a solution of 0.56 g. of sodium nitrite in 10 cc. of water. The separated and dried chloroform layer was refluxed for four hours, then evaporated. The residue was crystallized from benzene-heptane and gave a yield of 1.17 g. (66%) of 4-carbanilido-5-ketoimidazolido [4,5,c,cis] thiophane. The product recrystallized from benzene-petroleum ether had a melting point of 164°–167° C.

A mixture of 0.67 g. of 4-carbanilido-5-ketoimidazolido [4,5,c,cis] thiophane and 5 cc. of 48% hydrobromic acid was refluxed for sixteen hours.

On cooling the solution deposited 0.30 g. of cis-3,4-diaminothiophane dihydrobromide. The product recrystallized from 48% hydrobromic acid gave white crystals melting at 309°–310° C. with decomposition.

A solution of 0.26 g. of cis-3,4-diaminothiophane dihydrobromide in 50 cc. of saturated sodium bicarbonate was treated with phosgene at 0.° C. until acidic, then evaporated to dryness in vacuo. The residue was extracted with hot butanol and the extract evaporated. Sublimation at 150° C. (1 mm.) gave 60 mg. of 5-ketoimidazolido [4,5,c,cis] thiophane as white crystals having a melting point of 231° C.

*Example 3*

To a hot suspension of 150 mg. of 2-(delta-carbanilidobutyl) - 3 - cis-carbohydrazide in 125 cc. of dry methanol was added a solution of 0.42 g. of hydrogen chloride in 5 cc. of methanol. To the clear solution was added 1.04 cc. of butyl nitrite with swirling. The solution was then refluxed for about an hour, gas evolution being complete in five minutes. Solvent was removed in vacuo and the residue cooled and triturated with methanol. A yield of 63.0 mg. of 2-(delta-carbanilidobutyl)-5-keto-6-carbanilidoimidazolido [4,5,c,cis] thiophane was obtained.

*Example 4*

To a hot suspension of 150 mg. of 2-(delta-carbanilidobutyl) - 4 - uranilinothiophane - 3 - cis - carboxhydrazide in 125 cc. of dry butanol was added a solution of 0.42 g. of hydrogen chloride in 5 cc. of butanol. To the clear solution was added 1.04 cc. of butyl nitrite with swirling. The reaction mixture was maintained at 55° C. for 2 hours. The reaction was completed by heating at 100° C. for one hour. The solvent was removed in vacuo and the residue cooled and triturated with methanol. A yield of 59.0 mg. of 2-(delta-carbanilidobutyl)-5-keto-6-carbanilidoimidazolido [4,5,c,cis] thiophane was obtained.

We claim:

1. Chemical compounds having the general formula:

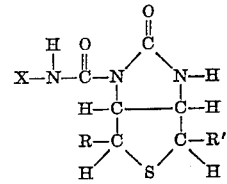

in which X is a member of the group consisting of hydrogen, alkyl and aryl radicals, and R and R′ are members of the group consisting of hydrogen, N-alkyl carbamidoalkyl radicals and N-aryl carbamidoalkyl radicals.

2. Chemical compounds having the general formula:

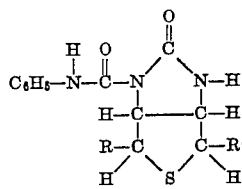

in which R and R′ are members of the group consisting of hydrogen, N-alkyl carbamidoalkyl radicals and N-aryl carbamidoalkyl radicals.

3. Chemical compounds having the general formula:

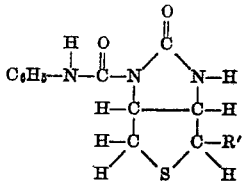

in which R' is a carbanilidoalkyl radical.

4. 2 - (delta - carbanilidobutyl) - 5 - keto - 6 - carbanilidoimidazolido [4,5,c,cis] thiophane.

5. 2 - (delta - carbanilidobutyl) - 5 - keto - 6 - N-methylcarbamido-imidazolido [4,5,c,cis] thiophane.

6. 2 - (delta - carbanilidobutyl) - 5 - keto - 6 - N-ethylcarbamido-imidazolido [4,5,c,cis] thiophane.

7. A method of preparing compounds having the general formula:

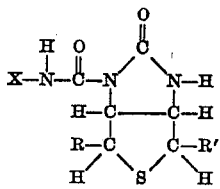

in which X is a member of the group consisting of hydrogen, aryl and alkyl radicals and R and R' are members of the group consisting of hydrogen, N-alkyl carbamidoalkyl radicals and N-aryl carbamidoalkyl radicals which comprises mixing a compound having the formula:

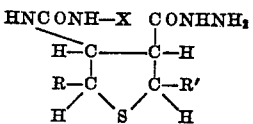

in which X, R and R' are as defined above, with a nitrite in the presence of a mineral acid and a lower aliphatic alcohol.

8. A method of preparing compounds having the general formula:

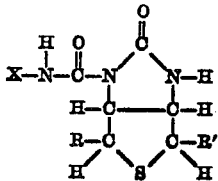

in which X is a member of the group consisting of hydrogen, alkyl and aryl radicals and R and R' are members of the group consisting of hydrogen, N-alkyl carbamidoalkyl radicals and N-aryl carbamidoalkyl radicals, which comprises heating a compound having the formula:

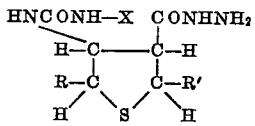

in which X, R and R' are as defined above, with a nitrite in the presence of a mineral acid and a lower aliphatic alcohol at a temperature of from about 60° C. to 100° C. for from about one-half hour to about three hours.

9. A method of preparing 2-(delta-carbanilidobutyl)-5-keto-6-carbanilidoimidazolido [4,5,c,cis] triophane which comprises mixing 2-(delta-carbanilidobutyl) - 4 - uranilinothiophane - 3 - cis - carboxyhydrazide with an alkyl nitrite in the presence of hydrogen chloride and a low molecular monohydric alkyl alcohol.

10. A method of preparing 2-(delta-carbanilidobutyl) - 5 - keto - 6 - N - methylcarbamidoimidazolido [4,5,c,cis] thiophane which comprises mixing 2 - (delta - carbanilidobutyl) - 4 - methyluramidothiophane-3-cis-carboxyhydrazide with an alkyl nitrite in the presence of hydrogen chloride and a low molecular monohydric alkyl alcohol.

11. A method of preparing 2-(delta-carbanilidobutyl) - 5 - keto - 6 - N - ethylcarbamidoimidazolido [4,5,c,cis] thiophane which comprises mixing 2-(delta-carbanilidobutyl)-4-ethyluramidothiophane-3-cis-carboxyhydrazide with an alkyl nitrite in the presence of hydrogen chloride and a low molecular monohydric alkyl alcohol.

BERNARD R. BAKER.
MERLE V. QUERRY.

No references cited.